US012618271B2

(12) United States Patent
Savant et al.

(10) Patent No.: US 12,618,271 B2
(45) Date of Patent: May 5, 2026

(54) DEVICE FOR IDENTIFYING A POSITION OF A VEHICLE HANDLE

(71) Applicant: MINEBEA ACCESSSOLUTIONS ITALIA S.P.A., Pianezza (IT)

(72) Inventors: Marco Savant, Pianezza (IT); Anthony Guerin, Pianezza (IT); Antonio Labalestra, Pianezza (IT); Cannavo Antonino, Pianezza (IT); Christophe Perrin, Alfortville (FR)

(73) Assignee: MINEBEA ACCESSSOLUTIONS ITALIA S.P.A., Pianezza (IT)

( * ) Notice: Subject to any disclaimer, the term of this patent is extended or adjusted under 35 U.S.C. 154(b) by 112 days.

(21) Appl. No.: 18/469,901

(22) Filed: Sep. 19, 2023

(65) Prior Publication Data

US 2024/0093541 A1 Mar. 21, 2024

(30) Foreign Application Priority Data

Sep. 20, 2022 (EP) ..................................... 22196543

(51) Int. Cl.
 *E05B 85/10* (2014.01)
 *B60R 16/027* (2006.01)
(52) U.S. Cl.
 CPC .......... *E05B 85/107* (2013.01); *B60R 16/027* (2013.01)
(58) Field of Classification Search
 CPC ...... E05B 85/103; E05B 85/107; E05B 81/64; E05B 81/76
 See application file for complete search history.

(56) References Cited

U.S. PATENT DOCUMENTS

| | | | |
|---|---|---|---|
| 10,655,371 B2 * | 5/2020 | Soonthornwinate .... | E05B 79/06 |
| 11,988,025 B2 * | 5/2024 | Yang ........................ | E05B 81/04 |
| 2014/0132012 A1 * | 5/2014 | Yoshino ............... | E05B 85/103 |
| | | | 292/336.3 |
| 2017/0089102 A1 * | 3/2017 | Yoshino .................. | E05B 79/22 |
| 2018/0171686 A1 | 6/2018 | Couto Maquieira et al. | |
| 2019/0291543 A1 | 9/2019 | Couto Maquieira et al. | |
| 2020/0173204 A1 * | 6/2020 | Murata .................. | E05B 81/06 |
| 2022/0170298 A1 | 6/2022 | Wilke et al. | |

OTHER PUBLICATIONS

European Search Report issued in corresponding EP Application 22196543, dated Mar. 9, 2023, 3 pages.

* cited by examiner

Primary Examiner — Christine M Mills
Assistant Examiner — Yahya Sidky
(74) Attorney, Agent, or Firm — Burris Law, PLLC

(57) ABSTRACT

A device for identifying a position of a grip member of a vehicle handle includes a cam rotatably movable inside the device around an axis fixed relative to the grip member. The cam is rotatably secured to a lever, which is rotatably movable around the axis, so that an angular position of the cam around the axis is directly related to an angular position of the lever around the axis. The angular position of the lever is also mechanically related to the position of the grip member. The device includes at least one switch secured to the handle and complementary to a member of the cam, so that the at least one switch is configured to be in electrical contact with the member of the cam when the angular position of the cam is equal to one or more predetermined angular positions around the axis.

12 Claims, 4 Drawing Sheets

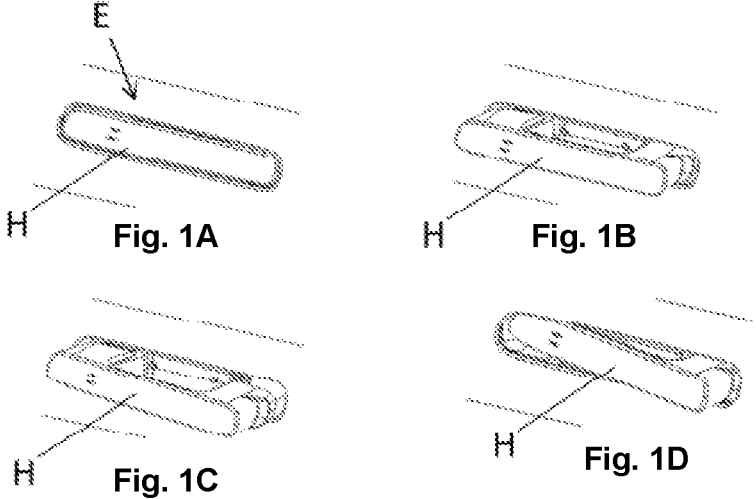
Fig. 1A Fig. 1B
Fig. 1C Fig. 1D
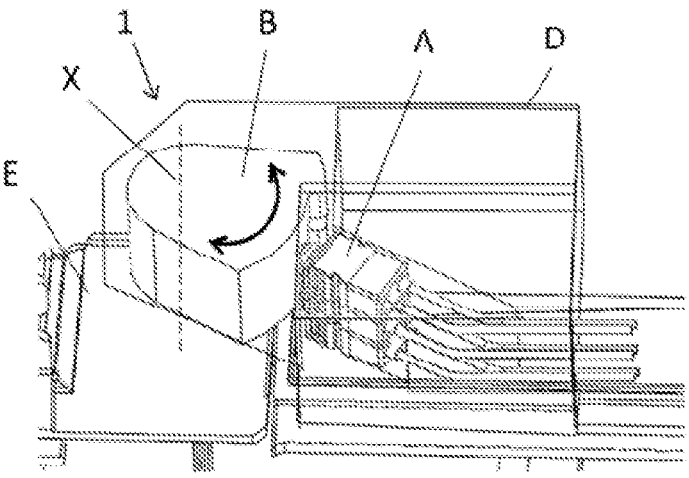
Fig. 2

DEVICE FOR IDENTIFYING A POSITION OF A VEHICLE HANDLE

CROSS-REFERENCE TO RELATED APPLICATIONS

This application claims priority to and the benefit of EP 22196543.7 filed on Sep. 20, 2022. The disclosures of the above applications are incorporated herein by reference.

FIELD

The present disclosure relates to the field of handles for vehicle doors, and in particular to devices for identifying a position of a handle.

BACKGROUND

The statements in this section merely provide background information related to the present disclosure and may not constitute prior art.

It is known, to identify a position of a handle for a vehicle door by using switches or electronic devices. In particular, when considering a flush handle, which is configured to be either in a flush position, or in a deployed position, or in any other position, it is known to identify the current flush handle position via a corresponding position of a rod configured to slide longitudinally inside the handle, the rod having a specific shape arranged to activate a specific switch, the specific switch depending on the position of the rod, the position of the rod being mechanically related, through a lever, to the position of the handle.

The deviation and tolerances of each single part of such mechanical arrangement can cause insufficient precision in the detection of the position of the handle.

SUMMARY

This section provides a general summary of the disclosure and is not a comprehensive disclosure of its full scope or all of its features.

The present disclosure provides a device for identifying a position of a grip member of a vehicle handle, the device including a cam rotatably movable inside the device around an axis, the axis being fixed relative to the grip member, the cam being rotatably secured to a lever, which is rotatably movable around the axis, so that an angular position of the cam around the axis is directly related to an angular position of the lever around the axis, the angular position of the lever being also mechanically related to the position of the grip member. The device further includes one or several switch(es). The one or several switch(es) are secured to the handle and complementary to a member of the cam, so that the one or several switch(es) is configured to be in electrical contact with the member of the cam when the angular position of the cam is equal to one or more predetermined angular position(s) around the axis.

According to these provisions, the tolerance chain to reach the predetermined angular position is reduced, and the precision is increased, so as a placement of the device in the handle is determined to avoid deformations of the device. In addition, the angular position of the housing member can be further adjusted, for example, during End-Of-Line testing. In that case, once the calibration of the switch box element, i.e., housing member, is completed, the position of the housing member on the handle assembly is blocked (e.g., via screwing or gluing).

According to one form, the disclosure includes one or more of the following features, alone or in any combination technically compatible.

According to a variation, the device further includes a housing member configured to be secured to the handle, the cam and the one or several switch(es) being lodged inside the housing member, and the one or several switch(es) being secured to the housing member.

According to these provisions, switches are centralized, which has the advantage of focusing accuracy in one element only, i.e., the device, improving the industrialization flow with one fitting operation, one operation of sealing, and localization of wire layout.

According to these provisions, the cam and the switch of the device are maintained and protected against the environment, and the device is a standalone device which may be mounted on the handle with proper centering and fixation.

According to one form, the member of the cam is a portion of a surface of the cam.

According to a form, the one or several switch(es) is protruding from a surface facing the portion of the surface of the cam.

According to a form, the member is protruding from a surface of the cam.

According to a form, the one or several switch(es) is one or more blades on a printed circuit board.

According to a form, the cam is rotatably secured to the lever through a transmission axle which is rigid.

According to a form, the cam is rotatably secured to the lever through a transmission axle which is resilient.

According to these provisions, alignment errors are absorbed, and tension is smoothed.

According to a form, the device further includes at least one electric wire connected to the one or several switch(es) at one end and configured to provide a signal at another end to an electrical control unit of the vehicle, the signal being representative of the position of the grip member of the vehicle handle of the vehicle.

According to another aspect, the disclosure provides a vehicle handle including a grip member and a device for identifying a position of the grip member according to any one of the forms described herein above.

According to another aspect, the disclosure provides a vehicle including a vehicle handle according to the above form.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1A through 1D are perspective views of a flush type vehicle handle in different positions in accordance with the teachings of the present disclosure, such as a flush position in FIG. 1A, a "deployed" position in FIG. 1B, an "open" position in FIG. 1C, and a "backup" position in FIG. 1D;

FIG. 2 is a perspective view of a device in accordance with the teachings of the present disclosure;

Figure 3:
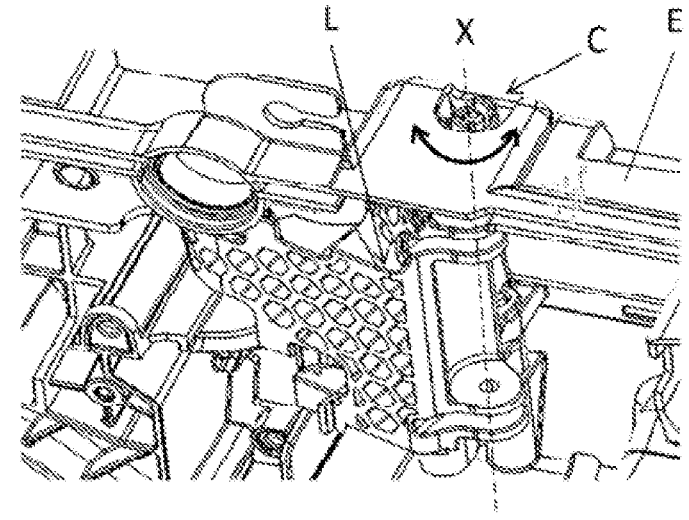
FIG. 3 is a perspective view of a vehicle handle configured to receive the device of FIG. 1, in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In FIGS. 1A through 1D, different typical handle positions of a flush handle E (only labeled in FIG. 1A for simplicity) are illustrated: FIG. 1A represents a "flush" position of a grip member H of the flush handle E, FIG. 1B represents a "deployed" position of the grip member H, and FIG. 1C represents an "open" position of the grip member H; the transition from one to the other of these successive positions is motorized and e-controlled, i.e., electronically controlled. FIG. 1D represents a backup position corresponding to a backup manual extraction of the grip member H of the flush handle E.

The positions of a grip member H are currently recognized by the activation of different switches through the movement of a rod having a specific shape to activate the proper switch. The signal of each single switch is sent to the vehicle or to an electronic control unit, which will recognize the handle position based on the signal, and will use this, for example, to stop or activate the actuator.

The disclosure details replacing this traditional activation of the switches, sliding away from the rod, by a system working in a rotational way, instead of the linear translation motion of the rod. Motion is transferred from a kinematic lever, directly from an axis of rotation; this reduces the tolerance chain to reach a target position. The handle consists of a housing in which at least one lever is arranged and a grip member which can be grasped by a user with his hand in order to open a door.

Thus, according to a form illustrated in FIGS. 2 and 3, a device 1 according to the disclosure includes a cam B rotatably movable around an axis X, the axis X being fixed relative to the grip member H of a vehicle handle E. The cam B is rotatably secured to a lever L, which is rotatably movable around the axis X, so that an angular position of the cam B around the axis X is directly related to an angular position of the lever L around the axis X, the angular position of the lever L being also mechanically related to the position of the grip member H. The device further includes one or several switch(es) A, A' (switch A' being shown in FIG. 7), the one or several switch(es) A, A' being secured to the vehicle handle E, especially to the housing of the vehicle handle E. The one or several switch(es) A, A' is configured to be in electrical contact with a complementary member M, M' (complementary member M' being shown in FIG. 4) of the cam B, when the angular position of the cam B is equal to one or more predetermined angular positions around the axis X.

Figure 8:
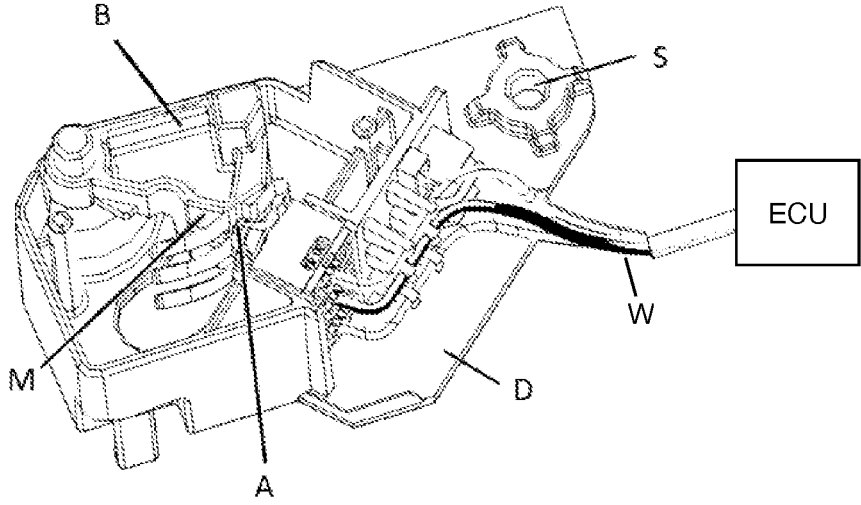
FIG. 8 is a perspective view of the variation of the device of FIG. 5, representing a housing member and its content, in accordance with the teachings of the present disclosure.

According to these provisions, the tolerance chain to reach the one or more predetermined angular positions is reduced, and the precision is increased, so as a placement of the device 1 in the handle is determined in order to avoid deformations of the device 1. In addition, the one or more predetermined angular positions of a housing member D can be further adjusted, for example, during End-Of-Line testing. In that case, once a calibration of the switch box element, i.e., the housing member D, is completed, the position of the housing member D on the vehicle handle E is blocked e.g., via gluing or screwing through a screwing member S of the housing member D, as illustrated in FIG. 8.

The device 1 may be considered as split in different parts, or as in a single box including all elements. Thus, for example, the device 1 also includes a housing member D, such as a box, configured to be secured to the vehicle handle E, the cam B and the one or several switch(es) A, A' being lodged inside the housing member D. The one or several switch(es) A, A' being secured to the housing member D.

According to these provisions, the one or several switches A, A' are centralized; this has the advantage of focusing accuracy in one element only, i.e., the device 1, and improving the industrialization flow with one fitting operation, one operation of sealing, and localization of wire layout.

According to these provisions, the cam B and the one or several switch(es) A, A' of the device 1 are maintained and protected against the environment, and the device 1 can be a standalone device 1 which may be mounted on the vehicle handle E with proper centering and fixation.

Figure 4:
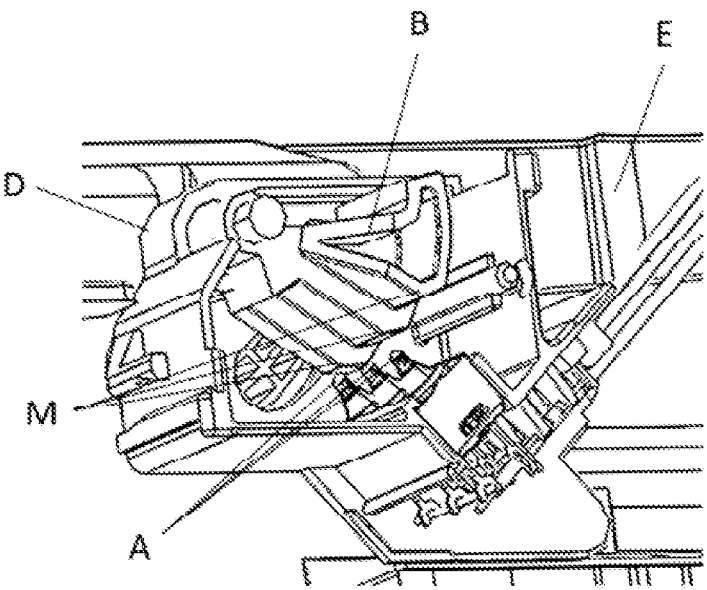
FIG. 4 is a perspective view of a variation of the device of FIG. 2, in accordance with the teachings of the present disclosure.

In an example form, the member M of the cam B is a portion of a surface of the cam B, as illustrated in FIG. 4. The one or several switch(es) A is protruding from a surface facing the portion of the surface of the cam B.

Figure 5:
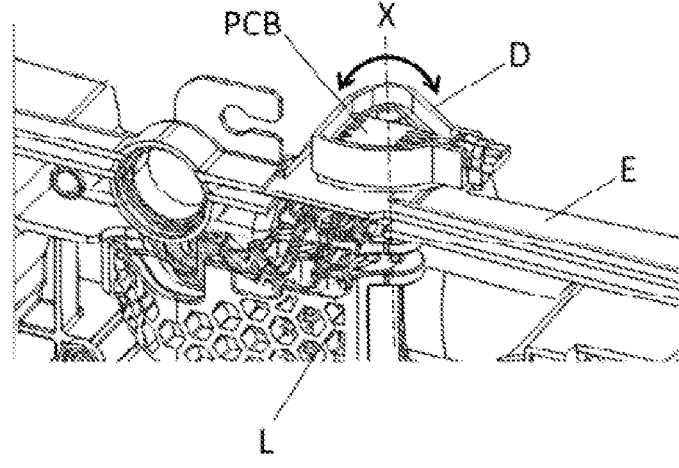
FIG. 5 is a perspective view of another variation of the device of FIG. 2, illustrated as mounted on a vehicle handle, in accordance with the teachings of the present disclosure.
Figure 6:
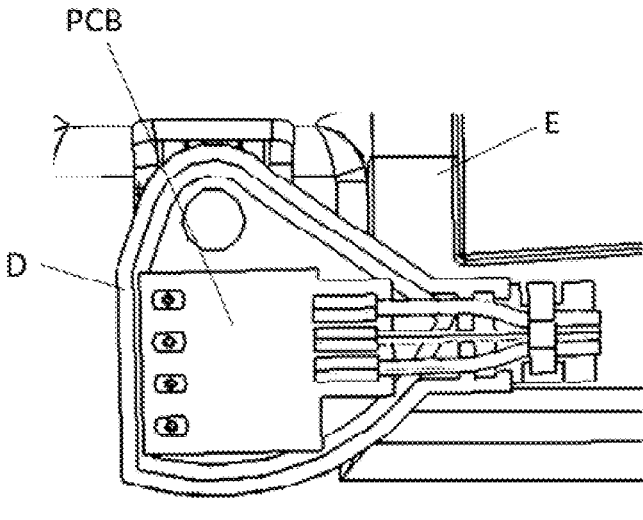
FIG. 6 is a top view of the variation of the device of FIG. 5.
Figure 7:
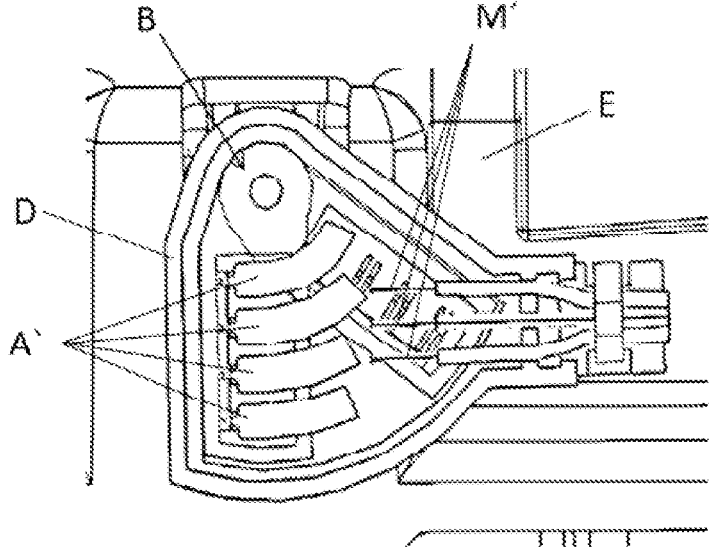
FIG. 7 is a top view of the variation of the device of FIG. 5, illustrated under a printed circuit board of this variation, in accordance with the teachings of the present disclosure.

In another example, the one or several switch(es) A' is one or more blades, as illustrated in FIG. 7, on a printed circuit board PCB as illustrated in FIGS. 5, 6 and 7. The complementary member M' is protruding from a surface of the cam B, as illustrated in FIG. 7.

In one form, as illustrated in FIG. 3, the cam B is rotatably secured to the lever L through a transmission axis or axle C, which is rigid.

In one variation, the transmission axle C is resilient. Thus, alignment errors are absorbed, and tension is smoothed.

Referring to FIG. 8, the device 1 may further include one or more electric wire(s) W connected to the one or several switch(es) A, A' at one end and configured to provide a signal at another end to an electrical control unit (ECU) of the vehicle, the signal being representative of the position of the grip member H of the vehicle handle E of the vehicle.

The disclosure also relates to a vehicle handle E including a grip member H and a device 1 for identifying a position of the grip member H, according to any one of the variations described herein above.

The disclosure also relates to a vehicle including a vehicle handle according to the variations described above.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A device for identifying a position of a grip member of a vehicle handle, the device comprising:
a cam rotatably movable inside the device around an axis, wherein the axis is fixed relative to the grip member, the cam being rotatably secured to a lever, which is rotatably movable around the axis, so that an angular position of the cam around the axis is directly related to an angular position of the lever around the axis, the angular position of the lever being also mechanically related to the position of the grip member; and
at least one switch, wherein the at least one switch is secured to the vehicle handle in a mounted state, and being complementary to a member of the cam, so that the at least one switch is configured to be in electrical contact with the member of the cam when the angular position of the cam is equal to one or more predetermined angular positions around the axis, wherein the cam is rotatably secured to the lever through a resilient transmission axle;
a housing member configured to be secured to the handle, the cam and the at least one switch being lodged inside the housing member, the at least one switch being secured to the housing member, the housing member is configured to move relative to the handle during a calibration phase of the switch and to be fixed relative to the handle once the calibration phase is complete.

2. The device according to claim 1, wherein the member of the cam is a portion of a surface of the cam.

3. The device according to claim 2, wherein the at least one switch protrudes from a surface facing the portion of the surface of the cam.

4. The device according to claim 1, wherein the member of the cam protrudes from a surface of the cam.

5. The device according to claim 2, wherein the at least one switch includes one or more blades on a printed circuit board (PCB).

6. The device according to claim 1, wherein the cam is rotatably secured to the lever through a rigid transmission axle.

7. The device according to claim 1, further comprising at least one electric wire connected to the at least one switch at one end and configured to provide a signal at another end to an electrical control unit of a vehicle, the signal being representative of the position of the grip member of the vehicle handle of the vehicle.

8. A vehicle handle comprising:
a grip member; and
the device according to claim 1.

9. A vehicle comprising:
the vehicle handle according to claim 8.

10. The device according to claim 1, wherein the cam is configured to be disposed on the vehicle handle.

11. The device according to claim 1, wherein the device is a standalone device configured to be mounted on the vehicle handle.

12. The device according to claim 1, wherein the at least one switch is coupled to the housing member.

* * * * *